US012007720B2

(12) United States Patent
Nakatsuka et al.

(10) Patent No.: US 12,007,720 B2
(45) Date of Patent: Jun. 11, 2024

(54) CASE AND TIMEPIECE

(71) Applicant: CASIO COMPUTER CO., LTD., Tokyo (JP)

(72) Inventors: Yoshiki Nakatsuka, Higashiyamato (JP); Takao Matsuda, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 622 days.

(21) Appl. No.: 17/196,505

(22) Filed: Mar. 9, 2021

(65) Prior Publication Data

US 2021/0278805 A1 Sep. 9, 2021

(30) Foreign Application Priority Data

Mar. 9, 2020 (JP) ................................ 2020-039690
Sep. 1, 2020 (JP) ................................ 2020-146875

(51) Int. Cl.

*G04B 37/00* (2006.01)
*G04B 37/14* (2006.01)
*G04B 37/22* (2006.01)

(52) U.S. Cl.

CPC ..... *G04B 37/0008* (2013.01); *G04B 37/1486* (2013.01); *G04B 37/22* (2013.01)

(58) Field of Classification Search

CPC ............ G04B 37/0008; G04B 37/1486; G04B 37/084; G04B 37/22; G04B 37/052; G04B 47/046; G04B 43/002

See application file for complete search history.

(56) References Cited

U.S. PATENT DOCUMENTS

| | | | | |
|---|---|---|---|---|
| 5,825,722 A * | 10/1998 | Meyrat | .................. | G04B 37/05 368/300 |
| 6,056,432 A * | 5/2000 | Oehninger | ........... | G04B 37/084 368/299 |
| 6,406,178 B1 * | 6/2002 | Luscher | ............... | G04B 37/084 368/286 |
| 6,762,976 B1 * | 7/2004 | Tamaru | ................ | G04B 43/002 368/300 |

(Continued)

FOREIGN PATENT DOCUMENTS

| | | |
|---|---|---|
| CN | 101410764 A | 4/2009 |
| JP | S5284252 U | 6/1977 |
| JP | 2000-329869 A | 11/2000 |

(Continued)

OTHER PUBLICATIONS

First Office Action dated Mar. 9, 2022 received in Chinese Patent Application No. CN 202110257251.8 together with an English language translation.

(Continued)

*Primary Examiner* — Edwin A. Leon

(74) *Attorney, Agent, or Firm* — Scully, Scott, Murphy & Presser, P.C.

(57) ABSTRACT

A case including a first case which has a retaining portion provided on an outer circumference thereof, an exterior member which has an engaging portion with which the retaining portion is engaged, and covers the outer circumference of the first case, a second case which is arranged on upper parts of the first case and the exterior member, and a fastening member which attaches the second case to the first case by fastening the second case to the exterior member.

21 Claims, 4 Drawing Sheets

(56) References Cited

U.S. PATENT DOCUMENTS

| | | | | |
|---|---|---|---|---|
| 10,025,273 | B2 * | 7/2018 | Iguchi | G04B 37/0008 |
| 2009/0103400 | A1 | 4/2009 | Grandperret | |

FOREIGN PATENT DOCUMENTS

| | | | |
|---|---|---|---|
| JP | 2009531670 | A | 9/2009 |
| JP | 4805437 | B2 | 11/2011 |
| JP | 6241759 | B2 | 12/2017 |
| JP | 2019060765 | A | 4/2019 |
| JP | 6690623 | B2 | 4/2020 |

OTHER PUBLICATIONS

Notice of Reasons for Refusal dated Jan. 27, 2022 received in Japanese Patent Application No. JP 2020-146875 together with an English language translation.

* cited by examiner

CASE AND TIMEPIECE

CROSS-REFERENCE TO RELATED APPLICATIONS

This application is based upon and claims the benefit of priority from the prior Japanese Patent Applications No. 2020-039690, filed Mar. 9, 2020, and No. 2020-146875, filed Sep. 1, 2020, the entire contents of which are incorporated herein by reference.

BACKGROUND

1. Technical Field

The technical field relates to a case that is used for electronic devices such as wristwatches and portable communication devices, and a timepiece equipped with the case.

2. Description of the Related Art

For example, a wristwatch case is known which has a structure including a first case which houses a timepiece module, a second case which is attached to the first case and to which a watch glass is attached, and an exterior member which is attached to the outer circumference of the first case, as described in Japanese Patent Application Laid-Open (Kokai) Publication No. 2000-329869.

SUMMARY

One embodiment is a case comprising: a first case which has a retaining portion provided on an outer circumference thereof; an exterior member which has an engaging portion with which the retaining portion is engaged, and covers the outer circumference of the first case; a second case which is arranged on upper parts of the first case and the exterior member; and a fastening member which attaches the second case to the first case by fastening the second case to the exterior member.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

An embodiment related to a wristwatch will hereinafter be described with reference to FIG. 1 to FIG. 4.

Figure 1:
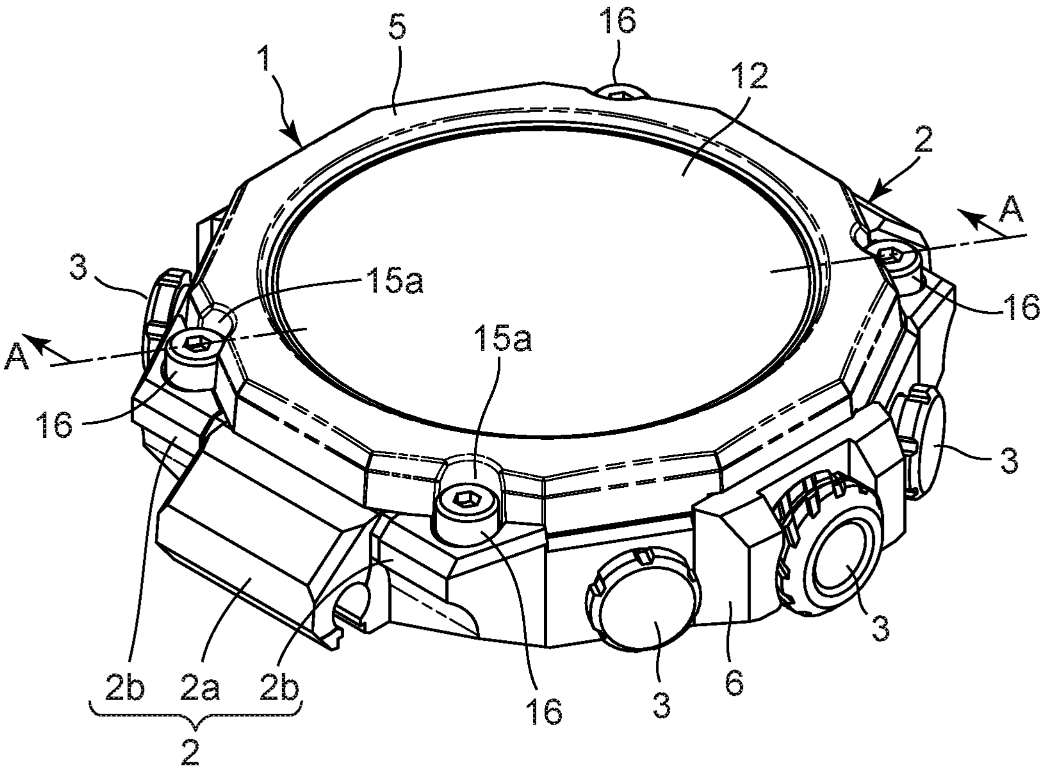
FIG. 1 is an enlarged perspective of an embodiment related to a wristwatch.

This wristwatch has a wristwatch case 1, as shown in FIG. 1. On the twelve o'clock side and six o'clock side of the wristwatch case 1, band attachment sections 2 are provided to which watch bands (not shown) are attached. Also, on the two o'clock side, three o'clock side, four o'clock side, and eight o'clock side of the wristwatch case 1, switch devices 3 are provided.

This wristwatch case 1 includes a first case 4, a second case 5 which is attached to the upper part of the first case 4, and an exterior case 6 serving as an exterior member which is arranged covering the outer circumference of the first case 4 and attached to the second case 5, as shown in FIG. 1 to FIG. 4. The first case 4, which houses a timepiece module (not shown), includes a cylindrical outer circumferential portion **4*a* and a bottom portion 4*b*** integrally formed by use of a hard synthetic resin.

Figure 2:
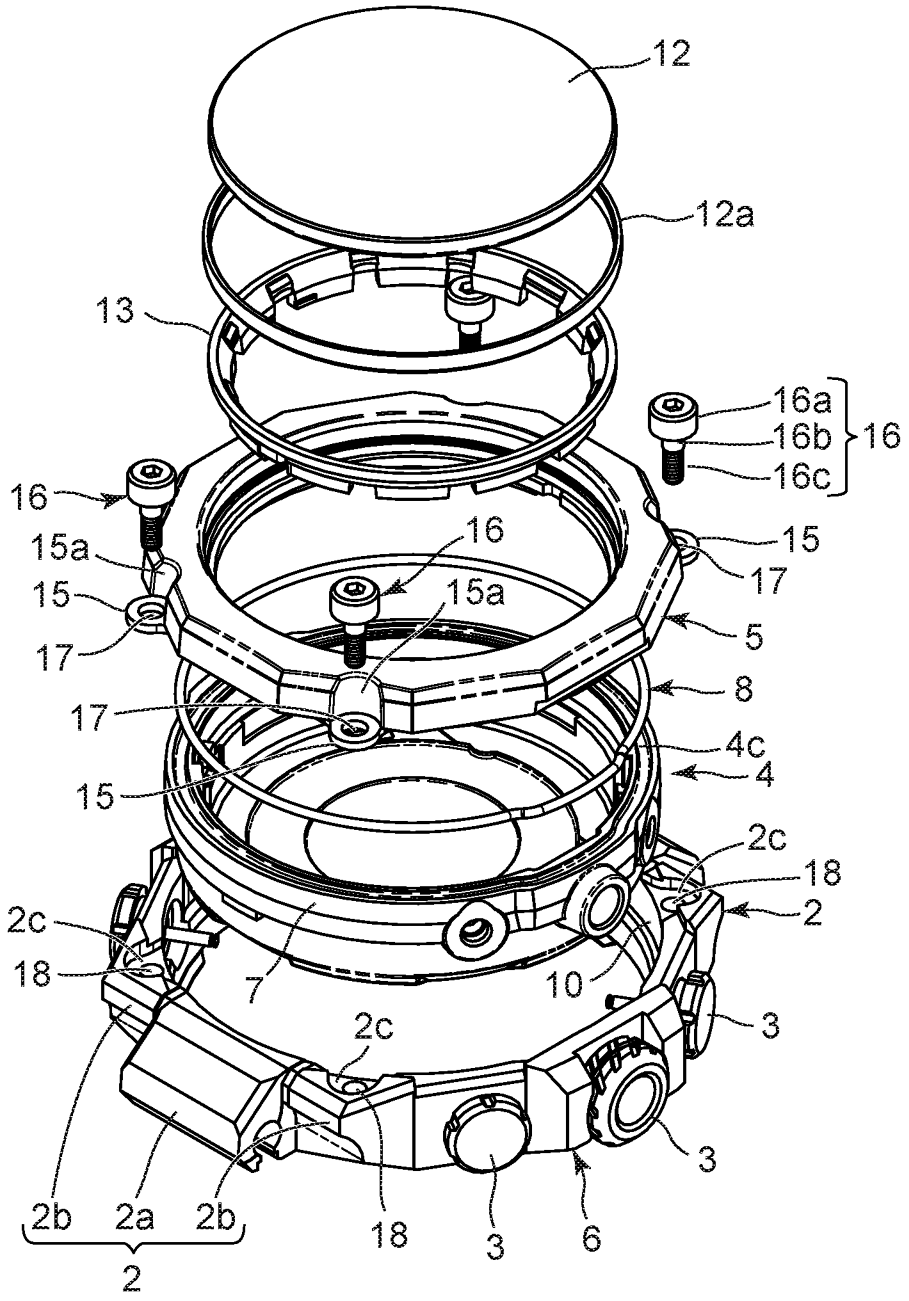
FIG. 2 is an enlarged perspective view of the wristwatch case of FIG. 1 in a disassembled state.
Figure 3:
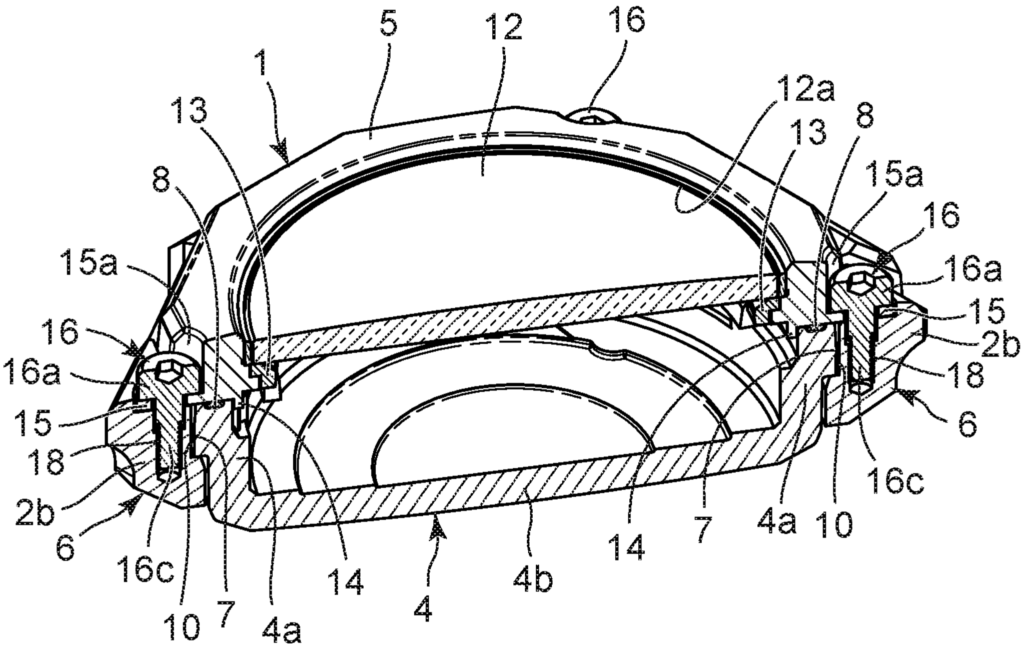
FIG. 3 is the enlarged perspective view of the wristwatch case taken along the A-A arrow view shown in FIG. 1.
Figure 4:
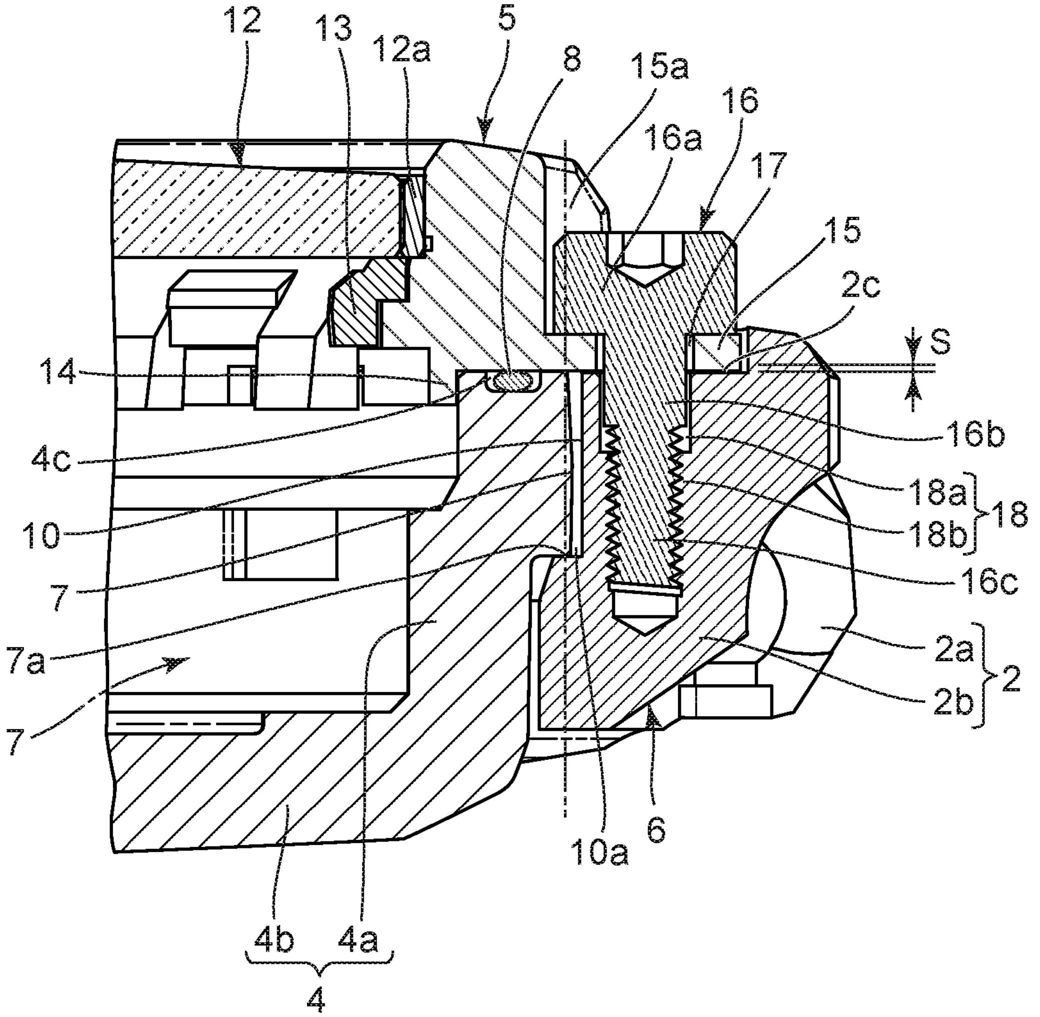
FIG. 4 is an enlarged sectional view of a main portion of the wristwatch case shown in FIG. 3.

More specifically, the first case 4 is formed of a hard synthetic resin having high rigidity, which is acquired by, for example, glass fiber or carbon fiber being mixed into polyimide resin, as shown in FIG. 2 to FIG. 4. On the outer circumferential surface of the outer circumferential portion **4*a* of this first case 4, a retaining projection section 7 is provided. This retaining projection section 7 is provided projecting on the upper part of the outer circumferential surface of the outer circumferential portion 4*a***.

The above-described retaining projection section 7 should preferably be provided extending around the entire outer circumferential surface of the outer circumferential portion **4*a*, as shown in FIG. 2 to FIG. 4. However, a structure may be adopted in which the retaining projection section 7 is provided on part of the outer circumferential surface. The projection length of the retaining projection section 7 from the outer circumferential surface of the outer circumferential portion 4*a* is sufficiently shorter than the thickness of the first case 4, such as about one-third of the thickness of the lower part of the outer circumferential portion 4*a***.

In the upper end surface of the first case 4, a packing groove **4*c* into which a case packing 8 is fitted is provided extending along the entire circumference of the first case 4, as shown in FIG. 2 to FIG. 4. The case packing 8 is formed to be circular in cross-section and to have a ring shape as a whole. The packing groove 4*c* is formed such that its depth is substantially equal to the radius of the cross-section of the case packing 8. As a result, when the case packing 8 is fitted into the packing groove 4*c*, about half of the case packing 8 on the upper side is exposed upward from the upper end surface of the first case 4**.

The exterior case 6 is formed of a metal such as stainless steel and has a substantially ring shape, as shown in FIG. 1 to FIG. 4. In the inner circumferential surface of this exterior case 6, an engaging recess section 10 with which the retaining projection section 7 of the first case 4 is engaged is provided. This engaging recess section 10 is provided on the upper side of the inner circumferential surface of the exterior case 6. That is, this engaging recess section 10 is provided extending from a middle portion of the inner circumferential surface of the exterior case 6 toward the upper end surface of the exterior case.

As a result, the exterior case 6 is structured such that, when this exterior case 6 is attached to the outer circumference of the first case 4 from below and the retaining projection section 7 of the first case 4 engages with the engaging recess section 10, a lower end portion **7*a* of the retaining projection section 7 comes in contact with a lower end portion 10*a* of the engaging recess section 10, whereby the first case 4 does not slip out in a downward direction, as shown in FIG. 2 to FIG. 4**.

On the twelve o'clock side and six o'clock side of this exterior case 6, the band attachment sections 2 of the wristwatch case 1 are provided to project outward, as shown in FIG. 1 to FIG. 4. Of the two band attachment sections 2, the band attachment section 2 on the six o'clock side includes a connection projection section 2*a* projecting obliquely downward from its outer circumferential surface portion corresponding to the six o'clock point, and attachment projection sections 2*b* having a substantially triangular shape and provided corresponding to the five o'clock point and the seven o'clock point. In this embodiment, the connection projection section 2*a* projects further outward than the attachment projection sections 2*b* located to the sides of the connection projection section 2*a*.

Also, as with the band attachment section 2 on the six or clock side, the band attachment section 2 on the twelve o'clock side includes a connection projection section 2*a* projecting obliquely downward from its outer circumferential surface portion corresponding to the twelve o'clock point, and attachment projection sections 2*b* having a substantially triangular shape and provided corresponding to the one o'clock point and the eleven o'clock point, as shown in FIG. 1 to FIG. 4. In the upper end surface of each attachment projection section 2*b* of each band attachment section 2, a bearing surface section 2*c* having a substantially circular shape is provided to be recessed in an area excluding outer peripheral edges of the upper end surface. This bearing surface section 2*c* is formed such that its bearing surface, that is, its bottom surface is positioned slightly lower than the upper end surface of the first case 4.

That is, the bearing surface section 2*c* of each attachment projection section 2*b* of each band attachment section 2 is formed such that its bearing surface is positioned slightly lower than the upper end surface of the first case 4 when the exterior case 6 is attached to the outer circumference of the first case 4 so that the retaining projection section 7 of the first case 4 engages with the engaging recess section 10 of the exterior case 6 and the lower end portion 7*a* of the retaining projection section 7 comes in contact with the lower end portion 10*a* of the engaging recess section 10, as shown in FIG. 4.

On the other hand, the second case 5, which is arranged on the upper ends of the first case 4 and the exterior case 6, is formed of a metal such as stainless steel and has a substantially ring shape, as shown in FIG. 1 to FIG. 4. On an upper inner circumferential portion of this second case 5, a watch glass 12 is mounted via a glass packing 12*a*. On a lower inner circumferential portion under this watch glass 12, a parting member 13 having a ring shape is mounted.

Also, on the lower end surface of the second case 5, a position restriction section 14 is provided projecting downward, as shown in FIG. 3 and FIG. 4. This position restriction section 14 is structured to come in contact with and fitted into the inner circumferential surface of the first case 4 so as to restrict the position of the second case 5 to the upper end of the first case 4 when the lower end surface of the second case 5 is arranged on the upper end surface of the first case 4.

Moreover, on half of the second case 5 on the twelve o'clock side and another half thereof on the six o'clock side, fixing sections 15 are provided projecting from the outer circumferential surface of the second case 5, which are arranged in the substantially circular bearing surface sections 2*c* formed in the upper ends of the attachment projection sections 2*b* of the band attachment sections 2 provided on the exterior case 6, as shown in FIG. 1 to FIG. 4. Among these fixing sections 15, the fixing sections 15 on the six o'clock side are formed having a substantially circular shape and corresponding to the five o'clock point and the seven o'clock point. Similarly, the fixing sections 15 on the twelve clock side are formed having a substantially circular shape and corresponding to the one o'clock point and the eleven o'clock point.

Each fixing section 15 of the second case 5 is formed in a substantially circular shape such that its size is the same as that of each bearing surface section 2*c* provided in the upper ends of the attachment projection sections 2*b* of the exterior case 6 and its thickness in a vertical direction is substantially the same as the depth of each bearing surface section 2*c*, as shown in FIG. 2 to FIG. 4. As a result, these fixing sections 15 are structured to be arranged in the bearing surface sections 2*c* of the attachment projection sections 2*b* when the second case 5 is arranged on the exterior case 6.

Also, in the outer side surface of the second case 5, cutout sections 15*a* having a substantially semi-circular shape are provided above the fixing sections 15, as shown in FIG. 1 to FIG. 4. More specifically, these cutout section 15*a* are formed by portions of the outer side surface of the second case 5 above and excluding the fixing sections 15, which correspond to the bearing surface sections 2*c* provided in the upper ends of the attachment projection sections 2*b* of the band attachment sections 2 of the exterior case 6, being cut out in a groove shape whose cross-sectional shape is a substantially semi-circular shape.

The second case 5 is attached to the exterior case 6 by screw members 16 that are fastening members, as shown in FIG. 1 to FIG. 4. Each screw member 16 includes a head section 16*a*, a neck section 16*b*, and a screw section 16*c*. The head section 16*a* is formed such that its outer diameter is substantially equal to that of each fixing section 15 of the second case 5. In each fixing section 15, a screw insertion hole 17 into which the neck section 16*b* of the corresponding screw member 16 is inserted is provided penetrating in the vertical direction.

Also, in the bearing surface sections 2*c* provided in the upper ends of the attachment projection sections 2*b* of the band attachment sections 2 on the exterior case 6, screw attachment holes 18 are provided corresponding to the screw insertion holes 17 of the fixing sections 15 of the second case 5, as shown in FIG. 2 to FIG. 4. Each screw attachment hole 18 includes a neck insertion hole section 18*a* into which the neck section 16*b* of the corresponding screw member 16 is inserted and a screw hole section 18*b* into which the screw section 16*c* of the corresponding screw member 16 is screwed, and these sections are coaxially formed.

The second case 5 and the exterior case 6 are structured such that, when the second case 5 is arranged on the upper ends of the first case 4 and the exterior case 6, and the fixing sections 15 of the second case 5 are arranged in the bearing surface sections 2*c* of the attachment projection sections 2*b* of the exterior case 6, the screw insertion holes 17 provided in the fixing sections 15 of the second case 5 are positioned coaxially with the screw attachment holes 18 provided in the bearing surface sections 2*c* of the attachment projection sections 2*b*, as shown in FIG. 4.

Accordingly, the screw members 16 are structured such that the screw sections 16*c* are inserted into the screw insertion holes 17 from above, inserted into the screw attachment holes 18, and screwed into the screw hole sections 18*b* with the second case 5 being arranged on the upper ends of the first case 4 and the exterior case 6 and the screw insertion holes 17 in the fixing sections 15 of the second case 5 being positioned coaxially with the screw attachment holes 18 in the bearing surface sections 2*c* provided in the upper ends of the attachment projection sections 2*b* of the exterior case 6, as shown in FIG. 4.

In this embodiment, each screw member 16 is structured to be tightened with its neck section 16*b* being inserted into the corresponding screw insertion hole 17 and the neck insertion hole section 18*a* of the corresponding screw attachment hole 18, its head section 16*a* covering the corresponding fixing section 15 of the second case 5, and a portion of the head section 16*a*, or more specifically, a substantially half of the head section 16*a* being arranged in the corresponding cutout section 15*a* above the fixing section 15, when its screw section 16*c* is inserted from above into the screw insertion hole 17 in the fixing section 15 of the second case 5 and the screw attachment hole 18 of the bearing surface section 2*c* of the corresponding attachment projection section 2*b* on the exterior case 6, and screwed into the screw hole section 18*b* of the screw attachment hole 18, as shown in FIG. 4.

As a result, each screw member 16 is structured such that, when its screw section 16*c* is screwed into the screw hole section 18*b* of the corresponding screw attachment hole 18 in the corresponding bearing surface section 2*c* of the exterior case 6 with its head section 16*a* covering and being in contact with the corresponding fixing section 15 of the second case 5, and thereby pulls the exterior case 6 toward the second case 5, the lower end portion 10*a* of the engaging recess section 10 of the exterior case 6 is pulled up to the lower end portion 7*a* of the retaining projection section 7 of the first case 4, and the upper end surface of the first case 4 is pressed against the lower end surface of the second case 5, whereby the second case 5 is attached to the first case 4 through the intermediary of the exterior case 6, as shown in FIG. 4

Accordingly, in this wristwatch case 1, each screw member 16, the second case 5, the first case 4, and the exterior case 6 are on a straight line shown by a two-dot dashed line in FIG. 4, and overlap with one another in a planar view, as shown in FIG. 4. More specifically, in this wristwatch case 1, the head section 16*a* of each screw member 16, the corresponding fixing section 15 of the second case 5, the retaining projection section 7 of the first case 4, the lower end portion 10*a* of the engaging recess section 10 of the exterior case 6 are structured to overlap with one another in this order on the straight line shown by the two-dot dashed line in FIG. 4.

Also, the first case 4 and the second case 5 are structured such that, when they are attached to each other by the screw members 16, the lower end surface of the second case 5 presses down the case packing 8 arranged in the packing groove 4*c* of the first case 4 so as to compress and deform the case packing 8 toward the inside of the packing groove 4*c*, and waterproofing between the upper end surface of the first case 4 and the lower end surface of the second case 5 is achieved by this compressed and deformed case packing 8, as shown in FIG. 4.

Also, the second case 5 and the exterior case 6 are structured such that, when they are attached to each other by the screw members 16, and the upper end surface of the first case 4 and the lower end surface of the second case 5 compress and deform the case packing 8 and come in contact with or come close to each other, the fixing sections 15 of the second case 5 are arranged in the bearing surface sections 2*c* provided in the upper ends of the attachment projection sections 2*b* of the exterior case 6, and a space S is formed between the lower end surface of each fixing section 15 of the second case 5 and the bearing surface of the corresponding bearing surface section 2*c*, as shown in FIG. 4.

Next, the mechanism of this wristwatch case 1 is described.

In the assembly of this wristwatch case 1, first, the exterior case 6 is attached to the outer circumference of the first case 4. Here, the exterior case 6 is mounted to the first case 4 from below, whereby the retaining projection section 7 provided on the outer circumferential portion 4*a* of the first case 4 engages with the engaging recess section 10 provided in the inner circumferential surface of the exterior case 6.

As a result, the lower end portion 10*a* of the engaging recess section 10 of the exterior case 6 comes in contact with the lower end portion 7*a* of the retaining projection section 7 of the first case 4 and is held there. Consequently, the exterior case 6 is attached to the outer circumferential portion 4*a* of the first case 4 without being upwardly slipped out. In this state, the case packing 8 is arranged in the packing groove 4*c* in the upper end surface of the first case 4 with its upper part being exposed. Then, in this state, the second case 5 is arranged on the upper ends of the first case 4 and the exterior case 6.

Here, before this arrangement, the parting member 13 is fitted from above into the second case 5, and the watch glass 12 and the glass packing 12*a* are fitted into the second case 5 in a manner to be located on the parting member 13. In this state, when the second case 5 is arranged on the upper ends of the first case 4 and the exterior case 6, the position restriction section 14 of the second case 5 is fitted into the first case 4 while being in contact with the inner circumferential surface of the first case 4. As a result, the second case 5 is arranged on the upper end surface of the first case 4 with its position being restricted.

Also, here, the fixing sections 15 of the second case 5 are arranged on the attachment projection sections 2*b* of the band attachment sections 2 of the exterior case 6. More specifically, the fixing sections 15 provided directly below the cutout sections 15*a* of the second case 5 are arranged in the bearing surface sections 2*c* in the upper end surfaces of the attachment projection sections 2*b*. Accordingly, the screw insertion holes 17 provided in the fixing sections 15 of the second case 5 are positioned coaxially with the screw attachment holes 18 provided in the bearing surface sections 2*c* of the attachment projection sections 2*b* on the exterior case 6.

In this state, the second case 5 is attached to the upper ends of the first case 4 and the exterior case 6 by the screw members 16. Here, the screw sections 16*c* of the screw members 16 are inserted into the screw insertion holes 17 from above and then inserted into the screw attachment holes 18. The neck sections 16*b* of the screw members 16 are inserted into the screw insertion holes 17 and the neck insertion hole sections 18*a* of the screw attachment holes 18. The head sections 16*a* are arranged on and cover the fixing sections 15 of the second case 5, and a portion of each head section 16*a*, or more specifically, a half of each head section 16*a* is arranged in the corresponding cutout section 15*a*.

In this state, when the screw sections 16*c* of the screw members 16 are screwed into the screw hole sections 18*b* of the screw attachment holes 18 so as to tighten the screw members 16, these screw sections 16*c* pull the exterior case 6 toward the second case 5 while being screwed into the screw hole sections 18*b* of the screw attachment holes 18 with the head sections 16*a* of the screw members 16 being in contact with and covering the upper surfaces of the fixing sections 15 of the second case 5. As a result, the lower end portion 10*a* of the engaging recess section 10 of the exterior case 6 pulls up the lower end portion 7*a* of the retaining projection section 7 of the first case 4.

In this embodiment, each screw member 16, the second case 5, the first case 4, and the exterior case 6 are on the straight line shown by the two-dot dashed line in FIG. 4, and overlap with one another in a planar view. More specifically, the head section 16*a* of each screw member 16, the corresponding fixing section 15 of the second case 5, the retaining projection section 7 of the first case 4, the lower end portion 10*a* of the engaging recess section 10 of the exterior case 6 overlap with one another in this order on the straight line shown by the two-dot dashed line in FIG. 4.

Accordingly, since the head sections 16*a* of the screw members 16 are located over the retaining projection section 7 of the first case 4, the second case 5 and the first case 4 can be reliably and firmly pressed against each other. As a result, the second case 5, the first case 4, and the exterior case 6 can be firmly attached to one another, and the downsizing of the wristwatch case 1 can be achieved.

Here, the lower end surface of the second case 5 is pressed to come close to or come in contact with the upper end surface of the first case 4 while compressing and deforming the case packing 8 fitted into the packing groove 4*c* in the upper end surface of the first case 4. As a result, waterproofing between the upper end surface of the first case 4 and the lower end surface of the second case 5 is achieved by the case packing 8, whereby airtightness therein is ensured. Also, here, the second case 5 is attached to the first case 4 through the intermediary of the exterior case 6.

Here, the fixing sections 15 of the second case 5 are arranged in the bearing surface sections 2*c* in the upper part of the attachment projection sections 2*b* of the band attachment sections 2 on the exterior case 6 with the upper end surface of the first case 4 and the lower end surface of the second case 5 being in contact with or close to each other while compressing and deforming the case packing 8, and the above-described space S is formed between the lower end surface of each fixing section of the second case 5 and the bearing surface of the corresponding bearing surface section 2*c*.

Accordingly, by the presence of each space S between the undersurface of each fixing section 15 of the second case 5 and the bearing surface of the corresponding bearing surface section 2*c*, the screw members 16 can be reliably tighten when the second case 5 and the exterior case 6 are attached to each other by the tightening of the screw members 16. As a result, the exterior case 6 is reliably pulled toward the second case 5, whereby the first case 4 is tightly pressed against the second case 5.

In this embodiment, the screw members 16 are attached to diagonally located portions of the band attachment sections 2 of the wristwatch case 1, or in other words, the fixing section 15 on the one o'clock side and the fixing section 15 on the seven o'clock side which are diagonally located on the second case 5, and the fixing section 15 on the eleven o'clock side and the fixing section 15 on the five o'clock side which are also diagonally located on the second case 5, whereby the second case 5 is reliably pressed against the first case 4 through the intermediary of the exterior case 6.

As a result, the case packing 8 is tightly held between the upper end surface of the first case 4 and the lower end surface of the second case 5 and compressed to be deformed. Consequently, waterproofing between the upper end surface of the first case 4 and the lower end surface of the second case 5 is reliably achieved, and the first case 4 is firmly attached to the second case 5 through the intermediary of the exterior case 6.

In the case of this wristwatch case 1, the screw attachment holes 18 to which the screw members 16 are attached are not provided in the first case 4. Therefore, the first case 4 is thin, whereby the downsizing of the entire wristwatch case 1 is achieved. Also, this wristwatch case 1 has the structure where the exterior case 6 is attached to the outer circumferential portion 4*a* of the first case 4 by the screw members 16 being attached to the attachment projection sections 2*b* of the band attachment sections 2 on the exterior case 6. Because of this structure where the screw members 16 are attached to the attachment projection sections 2*b*, the exterior case 6 itself is not required to be formed large, whereby the downsizing of the entire wristwatch case 1 is achieved.

Also, in the case of this wristwatch case 1, the first case 4 is formed of a hard synthetic resin, the outer circumferential portion 4*a* of the first case 4 is covered by the exterior case 6 formed of a metal such as stainless steel, and the upper part of the first case 4 is covered by the second case 5 formed of a metal such as stainless steel. As a result, by the exterior case 6 and the second case 5, the first case 4 is reliably and favorably protected. Accordingly, even if the wristwatch case 1 is subjected to an external impact, the first case 4 is not damaged or broken by this impact.

As such, this wristwatch case 1 includes the first case 4 which has the retaining projection section 7 provided on its outer circumference, the exterior case 6 serving as an exterior member which has the engaging recess section 10 with which the retaining projection section 7 is engaged, and coves the outer circumference of the first case 4, the second case 5 which is arranged on the upper parts of the first case 4 and the exterior case 6, and the screw members 16 serving as fastening members which attach the second case 5 to the first case 4 by fastening the second case 5 to the exterior case 6. As a result of this structure, the number of components can be reduced and the downsizing of the entire wristwatch case 1 can be achieved.

That is, in this wristwatch case 1, the retaining projection section 7 of the first case 4 engages with the engaging recess section 10 of the exterior case 6. Accordingly, when the second case 5 is being attached to the exterior case 6 by the screw members 16, the engaging recess section 10 of the exterior case 6 brings the retaining projection section 7 of the first case 4 toward the second case 5 by the tightening of the screw members 16. As a result of this structure, by the exterior case 6, the first case 4 can be reliably and favorably attached to the second case 5.

Accordingly, in this wristwatch case 1, it is only required that the second case 5 be attached to the exterior case 6 by the screw members 16. By this structure, the number of required screw members 16 can be reduced and the assembling work can be simplified. In addition, in this wristwatch case 1, no screw members 16 are attached to the first case 4. Accordingly, the first case 4 can be thinly formed, whereby the downsizing of the entire wristwatch case 1 can be achieved.

In the case of this wristwatch case 1, the retaining projection section 7 is provided to project outward from the outer circumferential surface of the first case 4, the engaging recess section 10 is provided to be recessed in the inner circumferential surface of the exterior case 6, and the lower end portion 7*a* of the retaining projection section 7 comes in contact with the lower end portion 10*a* of the engaging recess section 10 by the retaining projection section 7 being inserted into and engaging with the engaging recess section 10 from above the exterior case 6. As a result, the first case 4 can be held in a manner not to slip out of the exterior case 6 in the downward direction.

Accordingly, in the case of this wristwatch case 1, when the second case 5 is being attached to the exterior case 6 by the screw members 16 after the retaining projection section 7 of the first case 4 is engaged with the engaging recess section 10 of the exterior case 6, the lower end portion 10*a* of the engaging recess section 10 of the exterior case 6 can reliably pull the lower end portion 7*a* of the retaining projection section 7 of the first case 4 toward the second case 5 by the tightening of the screw members 16. Consequently, by the exterior case 6, the first case 4 can be reliably and favorably attached to the second case 5.

Also, in this wristwatch case 1, the case packing 8 is arranged between the opposing surfaces of the first case 4 and the second case 5. When the second case 5 is attached to the exterior case 6 by the screw members 16, this case packing 8 is tightly held between the first case 4 and the second case 5, whereby waterproofing between the first case 4 and the second case 5 is reliably and favorably achieved.

That is, in this wristwatch case 1, the case packing 8 is arranged in the packing groove 4*c* in the upper end surface of the first case 4 such that its upper part is exposed. Accordingly, when the second case 5 is attached to the exterior case 6 by the tightening of the screw members 16, the case packing 8 is tightly held between the first case 4 and the second case 5 and thereby compressed and deformed. As a result, waterproofing between the first case 4 and the second case 5 is reliably achieved.

Moreover, in this wristwatch case 1, the spaces S are formed between the opposing surfaces of the second case 5 and the exterior case 6, that is, the undersurface of the second case 5 and the upper surface of the exterior case 6. Accordingly, when the second case 5 is being attached to the exterior case 6 by the screw members 16, these screw members 16 can be sufficiently tightened, whereby the upper surface of the first case 4 can be reliably pressed against the undersurface of the second case 5.

That is, in this wristwatch case 1, by the presence of each space S between the undersurface of each fixing section 15 of the second case 5 and the bearing surface of each bearing surface section 2*c* provided in the upper ends of the attachment projection sections 2*b* of the band attachment sections 2 on the exterior case 6, the screw members 16 can be reliably tighten when the second case 5 and the exterior case 6 are attached to each other by the tightening of the screw members 16. As a result, the exterior case 6 can be reliably pulled toward the second case 5, whereby the first case 4 can be tightly pressed against the second case 5.

Furthermore, in this wristwatch case 1, the band attachment sections 2 are provided projecting on the outer circumference of the exterior case 6, the fixing sections 15 which are arranged in the band attachment sections 2 are provided on the second case 5, and the band attachment sections 2 of the exterior case 6 and the fixing sections 15 of the second case 5 are attached by the screw members 16. As a result of this structure, the downsizing of the entire wristwatch case 1 can be reliably and favorably achieved.

That is, in this wristwatch case 1, the screw members 16 are attached to the attachment projection sections 2*b* of the band attachment sections 2 of the exterior case 6. Therefore, the exterior case 6 itself, which is attached to the outer circumferential portion 4*a* of the first case, is not required to be formed large. By this structure as well, the downsizing of the entire wristwatch case 1 can be achieved. In this embodiment, each screw member 16 is formed such that the outer diameter of its head section 16*a* is substantially the same as that of each fixing section 15 of the second case 5. Accordingly, by the head sections 16*a*, the fixing sections 15 can be covered and hidden so as not to be seen from the outside.

Still further, in this wristwatch case 1, the screw members 16 are attached to the arrangement positions of the fixing sections 15 diagonally located on the second case 5. Accordingly, by the screw members 16, the exterior case 6 can be reliably fastened and attached to the diagonally located portions of the second case 5. As a result, the first case 4 can be reliably pressed against and attached to the second case 5, and the case packing 8 can be reliably and tightly held between the first case 4 and the second case 5.

That is, in this wristwatch case 1, the second case 5 and the exterior case 6 can be pressed against and attached to each other by the screw members 16 in the diagonally located portions of the band attachment sections 2 of the wristwatch case 1, or in other words, the screw members 16 in the fixing section 15 on the one o'clock side and the fixing section 15 on the seven of clock side which are diagonally located on the second case 5, and in the fixing section 15 on the eleven o'clock side and the fixing section 15 on the five o'clock side which are also diagonally located on the second case 5. Accordingly, the first case 4 can be efficiently and reliably attached to the second case 5 through the intermediary of the exterior case 6.

As a result of this structure, in this wristwatch case 1, the number of screw tightening portions by screw members 16 can be kept at a minimum. Consequently, the first case 4 can be firmly attached to the second case 5 through the intermediary of the exterior case 6 and the case packing 8 can be reliably and tightly held between the upper end surface of the first case 4 and the lower end surface of the second case 5 with a few screw members 16, so that waterproofing between the first case 4 and the second case 5 can be reliably achieved with the few screw members 16.

Also, in this wristwatch case 1, in the outer side surface of the second case 5, the cutout sections 15*a* where the head sections 16*a* of the screw members 16 are arranged are provided corresponding to the fixing sections 15. Accordingly, when the first case 4 and the second case 5 are attached to each other by the screw members 16, the fixing sections 15 of the second case 5 are covered and hidden by the head sections 16*a* of the screw member 16, and a portion of each head section 16*a* is arranged in the corresponding cutout section 15*a*. As a result of this structure, the head sections 16*a* do not offer any hindrance, and a product with a good design can be provided.

Moreover, in this wristwatch case 1, each screw member 16, the second case 5, the first case 4, and the exterior case 6 are on the straight line shown by the two-dot dashed line in FIG. 4, and overlap with one another in a planar view. Accordingly, the second case 5, the first case 4, and the exterior case 6 can be firmly attached to one another. That is, in this wristwatch case 1, the head section 16*a* of each screw member 16, the corresponding fixing section 15 of the second case 5, the retaining projection section 7 of the first case 4, the lower end portion 10*a* of the engaging recess section 10 of the exterior case 6 overlap with one another in this order on the straight line. Accordingly, the head sections 16*a* of the screw members 16 can be located over the retaining projection section 7 of the first case 4.

As a result, in this wristwatch case 1, the second case 5 and the first case 4 can be reliably and firmly pressed against each other by the head sections 16*a* of the screw members 16, whereby the second case 5, the first case 4, and the exterior case 6 can be firmly attached to one another, and the downsizing of the wristwatch case 1 can be achieved.

Furthermore, in this wristwatch case 1, the first case 4 is formed of a hard synthetic resin, and the exterior case 6 and the second case 5 are formed of metal. That is, the first case 4 formed of a synthetic resin can be reliably and favorably protected by the exterior case 6 and the second case 5 formed of metal. As a result of this structure, even if the wristwatch case 1 is subjected to an external impact, the first case 4 is not damaged or broken by this impact.

The above-described embodiment has the structure where the retaining projection section 7 of the first case 4 is provided to project outward from the outer circumferential surface of the outer circumferential portion 4*a* of the first case 4, the engaging recess section 10 of the exterior case 6 is provided to be recessed in the inner circumferential surface of the exterior case 6, and the retaining projection section 7 is inserted into and engaged with the engaging recess section 10 from above the exterior case 6. However, the present invention is not limited thereto. For example, a structure may be adopted in which a retaining recess section is provided in the outer surface of the outer circumferential portion 4*a* of the first case 4 and an engaging projection section is provided on the inner circumferential surface of the exterior case 6.

In this structure, the retaining recess section is provided extending from the middle part of the outer surface of the outer circumferential portion 4*a* of the first case 4 to the lower end thereof, and the engaging projection section is provided on the lower part of the inner circumferential surface of the exterior case 6. Then, when the exterior case 6 is to be attached to the outer circumferential portion 4*a* of the first case 4, the engaging projection section of the exterior case 6 is mounted to the retaining recess section from below the first case 4, and an upper end portion of the engaging projection section comes in contact and engages with an upper end portion of the retaining recess section. That is, in this case, although the cross-section structure is resultantly the same as that of the above-described embodiment, the retaining recess section of the first case 4 serves as a retaining section according to the present invention and the engaging projection section of the exterior case 6 serves as an engaging section according to the present invention, whereas the retaining projection section 7 of the first case 4 serves as a retaining section according to the present invention and the engaging recess section 10 of the exterior case 6 serves as an engaging section according to the present invention in the above-described embodiment.

Also, in the above-described embodiment, the packing groove 4*c* is provided in the upper end surface of the first case 4, and the case packing 8 is fitted into this packing groove 4*c*. However, the present invention is not limited thereto. For example, a structure may be adopted in which a packing groove is provided in the lower end surface of the second case 5, and the case packing 8 is fitted into this packing groove.

Moreover, in the above-described embodiment, each screw member 16 has the head section 16*a*, the neck section 16*b*, and the screw section 16*c*. However, the present invention is not limited thereto, and a structure may be adopted in which each screw member 16 has only a head section and a screw section. In that structure, each screw attachment hole 18 of the exterior case 6 may be constituted by only the screw hole section 18*b*.

Furthermore, as fastening members in the above-described embodiment, the screw members 16 have been used. However, fastening members for the present invention are not limited to the screw members 16, and any fastening member can be used as long as it can press the second case 5 against the exterior case 6 and fasten the second case 5 to the exterior case 6.

Still further, in the above-described embodiment where the first case 4 is thinly formed, the exterior case 6 may be thickly formed so as to increase the impact resistance of the wristwatch case 1 against external impacts.

Yet still further, in the above-described embodiment, the present invention has been applied in a wristwatch. However, the present invention is not necessarily required to be applied in a wristwatch. For example, the present invention is applicable to various types of timepieces such as a travel watch, an alarm clock, a table clock, and a wall clock. In addition, the present invention is not necessarily required to be applied in timepieces, and is applicable to electronic devices such as a portable terminal and a portable communication device.

While the present invention has been described with reference to the preferred embodiments, it is intended that the invention be not limited by any of the details of the description therein but includes all the embodiments which fall within the scope of the appended claims.

What is claimed is:

1. A case comprising:

a first case which has a retaining portion provided on an outer circumference thereof;

an exterior member which has an engaging portion with which the retaining portion is engaged, and covers the outer circumference of the first case;

a second case which is arranged on upper parts of the first case and the exterior member; and a fastening member which attaches the second case to the first case by fastening the second case to the exterior member.

2. The case according to claim 1, wherein the retaining portion is provided to project outward from an outer circumferential surface of the first case, wherein the engaging portion is provided to be recessed in an inner circumferential surface of the exterior member, and wherein the retaining portion is inserted into and engaged with the engaging portion from above the exterior member.

3. The case according to claim 1, wherein a case packing is arranged between opposing surfaces of the first case and the second case.

4. The case according to claim 2, wherein a case packing is arranged between opposing surfaces of the first case and the second case.

5. The case according to claim 1, wherein a space is formed between opposing surfaces of the second case and the exterior member.

6. The case according to claim 2, wherein a space is formed between opposing surfaces of the second case and the exterior member.

7. The case according to claim 1, wherein a band attachment portion is provided projecting on an outer circumference of the exterior member, a fixing portion which is arranged in the band attachment portion is provided on the second case, and the fixing portion of the second case and the band attachment portion of the exterior member are attached to each other by the fastening member.

8. The case according to claim 2, wherein a band attachment portion is provided projecting on an outer circumference of the exterior member, wherein a fixing portion which is arranged in the band attachment portion is provided on the second case, and wherein the fixing portion of the second case and the band attachment portion of the exterior member are attached to each other by the fastening member.

9. The case according to claim 1, wherein the fastening member is a screw member.

10. The case according to claim 2, wherein the fastening member is a screw member.

11. The case according to claim 7, wherein the fastening member is a screw member, and wherein a cutout portion where a head of the screw member is arranged is provided in an outer side surface of the second case while corresponding to the fixing portion.

12. The case according to claim 8, wherein the fastening member is a screw member, and wherein a cutout portion where a head of the screw member is arranged is provided in an outer side surface of the second case while corresponding to the fixing portion.

13. The case according to claim 1, wherein the fastening member, the second case, the first case, and the exterior member are on a straight line from the upper parts to lower parts in order and overlap with one another in a planar view.

14. The case according to claim 2, wherein the fastening member, the second case, the first case, and the exterior member are on a straight line from the upper parts to lower parts in order and overlap with one another in a planar view.

15. The case according to claim 3, wherein the fastening member, the second case, the first case, and the exterior member are on a straight line from the upper parts to lower parts in order and overlap with one another in a planar view.

16. The case according to claim 5, wherein the fastening member, the second case, the first case, and the exterior member are on a straight line from the upper parts to lower parts in order and overlap with one another in a planar view.

17. The case according to claim 7, wherein the fastening member, the second case, the first case, and the exterior member are on a straight line from the upper parts to lower parts in order and overlap with one another in a planar view.

18. The case according to claim 1, wherein the first case is formed of a hard synthetic resin, and the exterior member and the second case are formed of metal.

19. The case according to claim 2, wherein the first case is formed of a hard synthetic resin, and the exterior member and the second case are formed of metal.

20. A timepiece comprising the case according to claim 1.

21. The case according to claim 1, wherein, under a state of being pinched with the second case and the exterior member, the retaining portion of the first case is fixed by the second case and the exterior member being fastened with the fastening member.

* * * * *